2,750,371

PRODUCTS FROM THE OXIDATION OF THE LACTONE OF HYDROXYTETRAHYDROABIETIC ACID

Lee A. Subluskey, Wilmington, Del., assignor to Hercules Powder Company, Wilmington, Del., a corporation of Delaware No Drawing. Application May 24, 1955,
Serial No. 510,829

5 Claims. (Cl. 260—99)

The present invention relates to new and useful compounds obtainable from the oxidation of the lactone of hydroxytetrahydroabietic acid.

It is well known that a crystalline lactone can be obtained from dihydroabietic acid by treatment with sulfuric acid. The lactone is commonly called the lactone of "hydroxytetrahydroabietic acid" and is characterized by a melting point of 131–132° C. and a specific rotation of −3°. The structure of the lactone has been recently established by reasonable evidence showing that the angular methyl group is at the 4b position and the alcoholic oxygen at the 4a position, the angular methyl group having shifted during lactonization from the 4a position which it has in dihydroabietic acid to the 4b position. The lactone is characterized by chemical stability and does not readily undergo reactions such as hydrolysis, etc. which break the lactone ring.

In accordance with the present invention, it has been found that valuable new compounds can be produced by oxidation of the lactone whereby oxidative attack takes place at the 7 position of the lactone or on the isopropyl group which occupies the 7-position. The compounds thereby produced and isolated have the formula

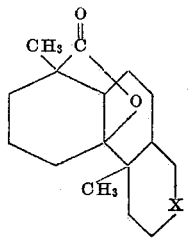

where X is a bivalent radical selected from the group consisting of

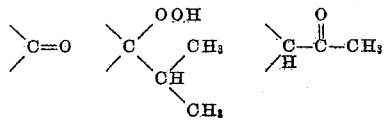

and

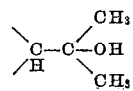

As above stated, the process of preparing the compounds of the invention involves oxidation of the lactone of hydroxytetrahydroabietic acid. The method of oxidation to be utilized in any given instance will depend upon the specific oxidation product or products desired. One method comprises oxidation of the lactone by means of anhydrous chromium trioxide which leads to an oxidation product containing the lactone of 7-acetyl-4a-hydroxy - 1,4b-dimethylperhydrophenanthrene-1-carboxylic acid (the 7-acetyl lactone) and the lactone of 4a-hydroxy - 1,4b-dimethyl-7-oxoperhydrophenanthrene-1-carboxylic acid (the 7-oxo lactone). Another method comprises oxidation with elemental oxygen which may be catalyzed by a metal oxidation catalyst or by ultraviolet light. This method of oxidation leads to a mixture of oxidation products from which can be isolated the aforesaid lactone of 4a-hydroxy-1,4b-dimethyl-7-oxoperhydrophenanthrene-1-carboxylic acid, the lactone of 4a,14-dihydroxy - 1,4b-dimethyl-perhydrophenanthrene-1-carboxylic acid (the 14-hydroxy lactone) and the lactone of 7-hydroperoxy - 4a-hydroxy-1,4b-dimethylperhydrophenanthrene-1-carboxylic acid (the 7-hydroperoxy lactone).

In order to illustrate the invention, the following examples are presented. Parts and percentages are by weight unless otherwise specified.

Example 1

There was prepared a solution of 30.4 parts of the lactone of hydroxytetrahydroabietic acid in approximately 425 parts of acetic acid and 490 parts of acetic anhydride. To this solution there was added 33.3 parts of solid chromium trioxide over a period of 7 hours, and the resulting solution was stirred at room temperature overnight. The resulting dark green solution was poured into 8000 parts of ice water containing 100 parts of sodium acetate and stirred for 3 hours. The resulting precipitate was removed by ether extraction and the ether extract was then washed with water until clear. Evaporation of the ether yielded 23 parts of a solid material.

The solid material was dissolved in 160 parts of absolute ethanol containing 20 parts of Girard's reagent (trimethylaminoacethydrazide hydrochloride) and 21 parts of acetic acid and boiled under reflux for 2 hours. The solution was cooled, poured into 1800 parts of ice water containing 12 parts of sodium hydroxide, and then extracted with ether. The aqueous layer from the extraction was again extracted with fresh ether and then acidified with 150 parts of concentrated hydrochloric acid. All of the ether extracts were combined, washed with water until neutral, dried and evaporated to yield 12.4 parts of a nonketonic residue which was discarded. The acidified aqueous layer was extracted with fresh water and the extract washed until neutral, dried and evaporated to dryness to yield 8.74 parts of a ketonic fraction. The ketonic fraction was dissolved in 20 parts of benzene and chromatographed on a column of basic alumina. The alumina was then eluted with various solvents to obtain seventeen fractions as follows:

| Fraction | Eluting Solvent | Wt. of Solvent (parts) | Wt. of Residue (parts) |
|---|---|---|---|
| 1 | Benzene | 45 | |
| 2 | do | 45 | |
| 3 | do | 45 | |
| 4 | do | 45 | 0.90 |
| 5 | do | 45 | |
| 6 | do | 45 | |
| 7 | do | 45 | |
| 8 | do | 440 | 1.13 |
| 9 | do | 879 | 1.20 |
| 10 | do | 879 | 0.45 |
| 11 | do | 879 | 0.35 |
| 12 | do | 2,300 | 0.59 |
| 13 | CH₂Cl₂ | 1,335 | 2.04 |
| 14 | CH₂Cl₂ | 1,335 | 0.41 |
| 15 | CH₂Cl₂ | 2,670 | 0.10 |
| 16 | Ether | 720 | nil |
| 17 | Ether—MeOH (1:1 by volume) | 1,500 | nil |
| | | | 7.17 |

Fractions 1–11 were mixed and recrystallized from isooctane to yield 3.75 parts of a crystalline material believed to be the 7-acetyl derivative of the starting lactone. This was confirmed by a positive iodoform test and an infrared absorption spectrum which indicated the presence of the expected groups. *Analysis.*—Found: C, 74.94; H, 9.46. Calculated for $C_{19}H_{28}O_3$: C, 74.96; H, 9.27.

Fractions 13 and 14 were combined and recrystallized from isopropyl ether which yielded 1.8 parts of a material melting at 150–152° C. This material was identified as the 7-oxo derivative of the starting lactone. *Analysis.*—Found: C, 73.97; H, 8.84. Calculated for $C_{17}H_{24}O_3$: C, 73.88; H, 8.75.

Example 2

Into a reaction vessel equipped with a stirrer and Dry Ice trap there was placed 60.8 parts of the lactone of hydroxytetrahydroabietic acid and about 3 parts of a solution of a 6% solution of cobalt (in the form of cobalt naphthenate) in petroleum naphtha as a catalyst. Oxygen was introduced into the reaction vessel with continuous stirring for 10 hours while the reaction was kept at a temperature of 140° C. Total oxygen consumed in this time amounted to 54.4 mole per cent of the lactone.

Approximately 5 parts of liquid, principally water, was found in the Dry Ice trap. There remained in the reaction vessel 62.8 parts of oxidate.

The 62.8 parts of oxidate obtained as above was dissolved in 132 parts of benzene and chromatographed on a column of acid alumina. The alumina was eluted with various solvents to give 13 fractions as follows:

| Fraction | Eluting Solvent | Wt. of Solvent (parts) | Wt. of Residue (parts) |
|---|---|---|---|
| 1 | Benzene | 1,320 | 0.00 |
| 2 | do | 790 | 38.30 |
| 3 | do | 880 | 5.75 |
| 4 | do | 1,320 | 2.07 |
| 5 | do | 2,200 | 0.86 |
| 6 | do | 2,640 | 0.85 |
| 7 | Benzene: $CH_2Cl_2$ (1:1 by vol.) | 3,330 | 1.42 |
| 8 | Benzene: $CH_2Cl_2$ (1:1 by vol.) | 3,330 | 3.73 |
| 9 | Benzene: $CH_2Cl_2$ (1:1 by vol.) | 3,330 | 0.59 |
| 10 | $CH_2Cl_2$ | 8,040 | 0.26 |
| 11 | $CH_2Cl_2$: Ether (1:1 by vol.) | 6,020 | 0.00 |
| 12 | Ether | 4,200 | 0.00 |
| 13 | Methanol | 4,750 | 1.14 |
|  |  |  | 54.97 |

Fraction 9 gave a crystalline, noncarbonyl residue which was recrystallized from acetone to yield pure 14-hydroxy lactone, M. P. 180.5–181.5° C.

Fractions 2 and 3 were crystallized from acetone to obtain a white crystalline compound (M. P. 126–7° C.) which was determined to be the starting lactone (X-ray analysis).

Fractions 4 and 5 were obtained as a yellow oil, and gave a positive carbonyl test with 2,4-dinitrophenylhydrazine reagent but a negative iodoform test. On standing the yellow oil crystallized slowly into very fine needles which were suspended in isooctane, filtered and dried. This gave crystals of M. P. 146.5–148° C. identified as the 7-oxo lactone. *Analysis.*—Found: C, 73.80; H, 8.74. Calculated for $C_{17}H_{24}O_3$: C, 73.88; H, 8.75.

Example 3

Into a reaction vessel equipped with stirrer, condenser and oxygen inlet tube there was placed 30.4 parts of the lactone of hydroxytetrahydroabietic acid. The lactone was heated to the molten state (130–135° C.) and oxygen was bubbled through the molten lactone for 11 hours, the first 2½ hours of which time the reaction vessel was exposed to ultraviolet light irradiation.. The crude oxidate in the flask at the end of the oxidation was analyzed as containing 5.7% hydroperoxides.

The crude oxidate was dissolved in 88 parts of benzene and poured through a glass column containing a mixture of silica gel and diatomaceous earth in a volume ratio of 2:1. The column was then eluted with solvent fractions as follows:

| Fraction | Solvent (parts) | Residue (parts) |
|---|---|---|
| 1 | 3,340 $CH_2Cl_2$ | 0 |
| 2 | 2,940 $CH_2Cl_2$ | 8.75 |
| 3 | 2,000 $CH_2Cl_2$ | 7.63 |
| 4 | 2,140 $CH_2Cl_2$ | 2.70 |
| 5 | 2,270 $CH_2Cl_2$ | 0.65 |
| 6 | 2,240 $CH_2Cl_2$ | 0.29 |
| 7 | 1,560 $CH_2Cl_2$: Ether (4:1 by vol.) | 0.11 |
| 8 | 1,920 $CH_2Cl_2$: Ether (4:1 by vol.) | 1.09 |
| 9 | 1,800 $CH_2Cl_2$: Ether (4:1 by vol.) | 1.66 |
| 10 | 2,040 $CH_2Cl_2$: Ether (4:1 by vol.) | 1.70 |
| 11 | 1,800 $CH_2Cl_2$: Ether (4:1 by vol.) | 1.35 |
| 12 | 1,800 $CH_2Cl_2$: Ether (4:1 by vol.) | 0.37 |
| 13 | 2,040 $CH_2Cl_2$: Ether (4:1 by vol.) | 0.43 |
| 14 | 2,140 $CH_2Cl_2$: Ether (3:2 by vol.) | 0.90 |
| 15 | 2,890 $CH_2Cl_2$: Ether (3:2 by vol.) | 0.35 |
| 16 | 2,780 $CH_2Cl_2$: Ether (3:2 by vol.) | 0.27 |
| 17 | 1,910 Ether | 0.25 |
| Total |  | 28.55 |

Cuts 2 through 7 were found by mixed melting point to be unreacted lactone. Since 20.13 g. of unreacted lactone was recovered, oxidation occurred to the extent of 31.5%.

From cut 11 was isolated by recrystallization of a crystalline compound (M. P. 178–180° C.) and identified as the 14-hydroxy lactone.

Example 4

The procedure of Example 3 was followed but reducing the oxidation time to 10 hours. A crude oxidate analyzing 10.5% hydroperoxides was obtained. This oxidate in the amount of 29.2 parts was distributed countercurrently in 6 separatory vessels between approximately 320 parts of 85% aqueous methanol and 260 parts of petroleum ether, the solvent phases being previously mutually saturated. After distribution, the solvent was evaporated and the contents of each separatory vessel was weighed. The weight distribution data and hydroperoxide concentrations for the various separatory vessels were as follows:

|  | MeOH Soluble | | | Petroleum Ether Soluble | | |
|---|---|---|---|---|---|---|
| Separatory Vessel No. | 0 | 1 | 2 | 3 | 4 | 5 |
| Weight Residue (parts) | 9.33 | 1.94 | 1.38 | 3.21 | 6.98 | 6.16 |
| Hydroperoxide (percent) | 23.1 | 20.2 | 7.3 | 1.0 | 0.17 | 0.15 |

As seen, a solid fraction in the amount of 9.33 parts analyzing 23.1% hydroperoxide was obtained.

Approximately 8 parts of the concentrated fraction (23.1% hydroperoxide) was dissolved in 25 parts of methylene chloride and chromatographed on a column of silica gel and diatomaceous earth in a 2:1 volume ratio. Elution of the column with methylene chloride and ether gave the following fractions:

| Fraction | Solvent (parts) | Residue (parts) | Hydroperoxide, percent |
|---|---|---|---|
| 1 | 1,800 $CH_2Cl_2$ : Ether (4 : 1 by vol.) | 0 | --- |
| 2 | 840 $CH_2Cl_2$ : Ether (4 : 1 by vol.) | 1.81 | 48.3 |
| 3 | 600 $CH_2Cl_2$ : Ether (4 : 1 by vol.) | 1.65 | 8.1 |
| 4 | 1,080 $CH_2Cl_2$ : Ether (4 : 1 by vol.) | 1.51 | 9.2 |
| 5 | 480 $CH_2Cl_2$ : Ether (4 : 1 by vol.) | 0.27 | 16.7 |
| 6 | 1,680 $CH_2Cl_2$ : Ether (4 : 1 by vol.) | 1.40 | 12.0 |
| 7 | 1,440 $CH_2Cl_2$ : Ether (4 : 1 by vol.) | 0.34 | 14.8 |
| 8 | 1,910 Ether | 0.60 | 14.7 |
| Total |  | 7.58 |  |

The preceding data indicate that at least three different hydroperoxides were present in the concentrated fraction. The structure of one of these hydroperoxides was determined by decomposing a 1.35 part sample of fraction 2 with ferrous sulfate. The major product of decomposition was the 7-oxo lactone thus proving that the hydroperoxide was the 7-hydroperoxy lactone.

As the examples have shown, the compounds of the invention can be made from the lactone of hydroxytetrahydroabietic acid by a variety of methods.

In one method, the lactone of hydroxytetrahydroabietic acid is oxidized by means of anhydrous chromium trioxide. The technique of this reaction is essentially the same as the technique for the oxidation of dehydroabietyl compounds disclosed in copending application Serial No. 496,914, filed March 25, 1955, by Thomas F. Sanderson. In this case, however, oxidative attack is confined to the 7-position of the nucleus and the primary reaction products are the 7-acetyl lactone and the 7-oxo lactone.

In another method of oxidation, the lactone of hydroxytetrahydroabietic acid is oxidized in molten state (130–140° C.) with elemental oxygen in the presence of from about 1 to 5% of a metal oxidation catalyst such as cobalt naphthenate. This reaction is usually performed in about 6 to 8 hours with a 30–35% conversion of the lactone to oxidation products. The crude oxidate can be chromatographically separated on silica gel using benzene, methylene chloride and ether as solvents to obtain fractions from which unreacted lactone, 7-oxo lactone and 14-hydroxy lactone may be crystallized.

In still another method of oxidation, the lactone of hydroxytetrahydroabietic acid is oxidized in molten state with elemental oxygen while subjecting the lactone to ultraviolet light during the initial stages of reaction. This method is useful principally for the preparation of hydroperoxides and a product fraction enriched in such hydroperoxides can be obtained by countercurrent distribution of the crude oxidate between petroleum ether and 85% aqueous methanol. The aqueous methanol phase thereby obtained is rich in hydroperoxides and may be further concentrated chromatographically on silica gel using methylene chloride and ether as solvents.

The compounds of the invention are useful in a plurality of ways. The hydroperoxides, for example, are valuable catalysts for the polymerization of synthetic rubber which is shown by the fact that the concentrate of 7-hydroperoxy lactone (Example 4) produced a conversion of 47% in 11.7 hours when tested in the standard GR–S–1500–X1 recipe.

The 7-oxo lactone and 14-hydroxy lactone are valuable plasticizing ingredients of nitrocellulose lacquers. To illustrate, each of these lactones was mixed separately with a solution of nitrocellulose in buty acetyl in an amount equal to the weight of nitrocellulose. Films were cast on metal from the solutions so prepared and were found to be as clear as similar films containing no lactone. Additionally, the films containing lactone exhibited improved gloss and adhesion.

The 7-acetyl lactone has several uses including that of a plasticizer for nitrocellulose in the manner of the above 7-oxo and 14-hydroxy lactone, and as an ingredient of neoprene adhesives to provide delayed tack properties.

What I claim and desire to protect by Letters Patent is:
1. A compound having the formula

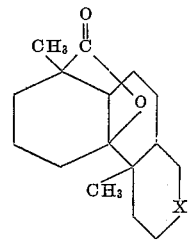

where X is a bivalent radical selected from the group consisting of

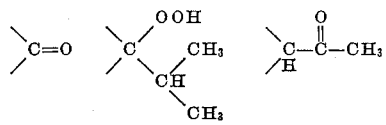

and

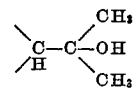

2. The lactone of 7-acetyl-4a-hydroxy-1,4b-dimethylperhydrophenanthrene-1-carboxylic acid.

3. The lactone of 4a-hydroxy-1,4b-dimethyl-7-oxoperhydrophenanthrene-1-carboxylic acid.

4. The lactone of 4a,14-dihydroxy-1,4b-dimethylperhydrophenanthrene-1-carboxylic acid.

5. The lactone of 7-hydroperoxy-4a-hydroxy-1,4b-dimethylperhydrophenanthrene-1-carboxylic acid.

No references cited.